Feb. 18, 1958  R. O. WYNN  2,823,888
GATE VALVE
Filed July 9, 1953  3 Sheets-Sheet 1
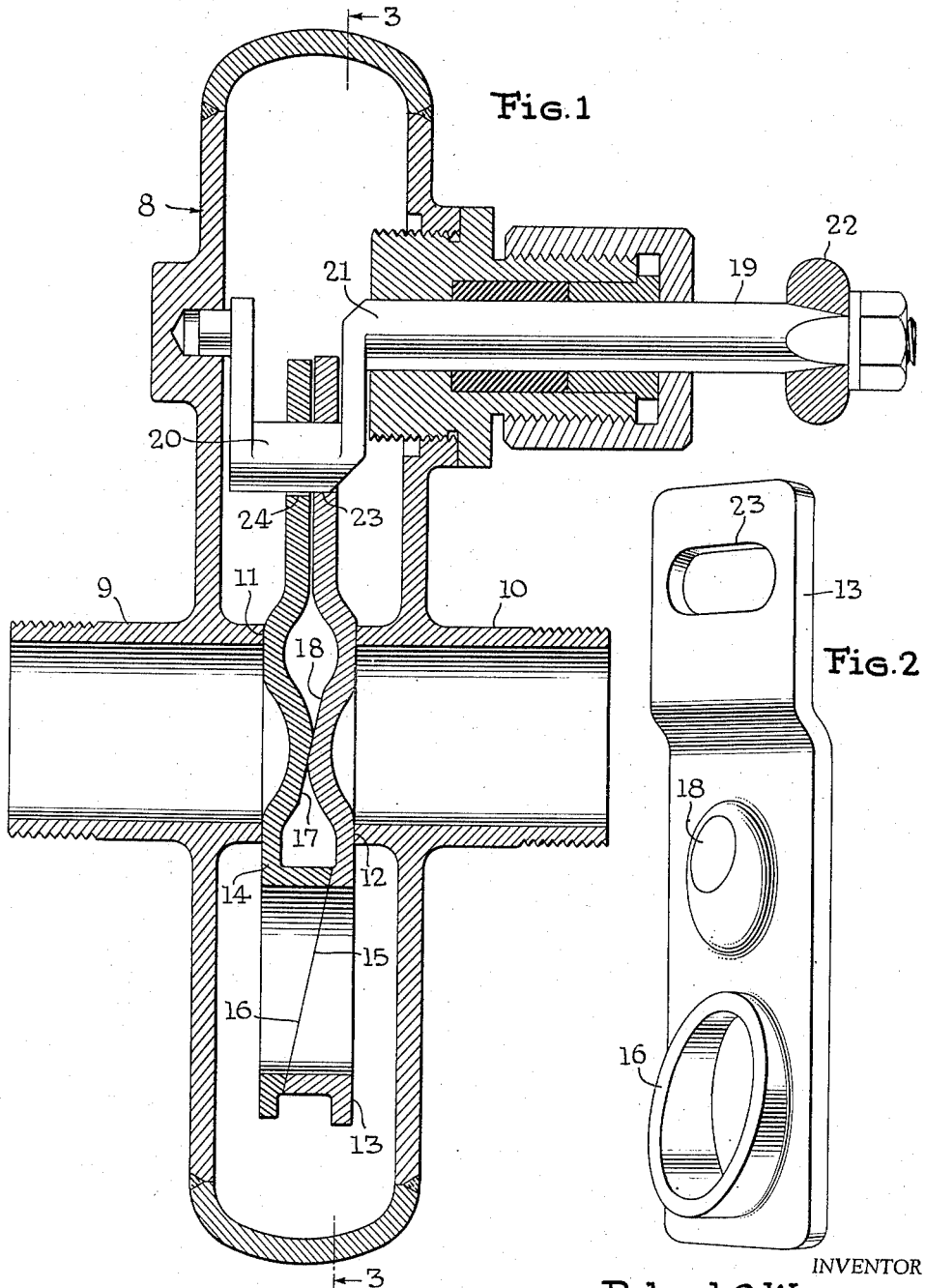
INVENTOR
Robert O. Wynn
BY
ATTORNEY Feb. 18, 1958  R. O. WYNN  2,823,888
GATE VALVE
Filed July 9, 1953  3 Sheets-Sheet 2

INVENTOR
Robert O. Wynn
BY
ATTORNEY

Feb. 18, 1958 R. O. WYNN 2,823,888
GATE VALVE
Filed July 9, 1953 3 Sheets-Sheet 3

INVENTOR
Robert O. Wynn
BY
ATTORNEY

United States Patent Office 2,823,888
Patented Feb. 18, 1958

2,823,888

GATE VALVE

Robert O. Wynn, Houston, Tex., assignor, by mesne assignments, to ACF Industries, Incorporated, a corporation of New Jersey Application July 9, 1953, Serial No. 366,981

5 Claims. (Cl. 251—196)

This invention relates to valves and more particularly to through conduit gate valves. It has particular application in that type of gate valve in which the gate comprises a two-part assembly mounted for rectilinear movement within the valve body and further adapted to be expanded laterally into sealing relation with the up and downstream seats in both the open and closed positions of the valve. Gate assemblies of this broad type are known and examples appear in many prior U. S. patents. See, for example, the U. S. patent to Laurent, No. 2,583,-512 of 1952 for a very complete disclosure of valves of this type. The instant invention involves the application of a quick opening and closing operator for a laterally expansible two-part gate assembly and at the same time provides a means for positively effecting the lateral expansion necessary to seal the valve in both open and closed positions.

It is the primary object of this invention, therefore, to provide a simple quick opening and closing means for a valve of the laterally expansible gate type and in which the quick opening and closing means serves at the same time to positively effect the desired lateral expansion of the gate assembly.

This and other objects will be apparent from the following description when read in conjunction with the attached sheets of drawings, in which:

Figure 1 is a sectional view in side elevation of a valve, including a preferred embodiment of the instant invention;

Figure 2 is a perspective view of one of the two members comprising the gate assembly;

Figure 3:
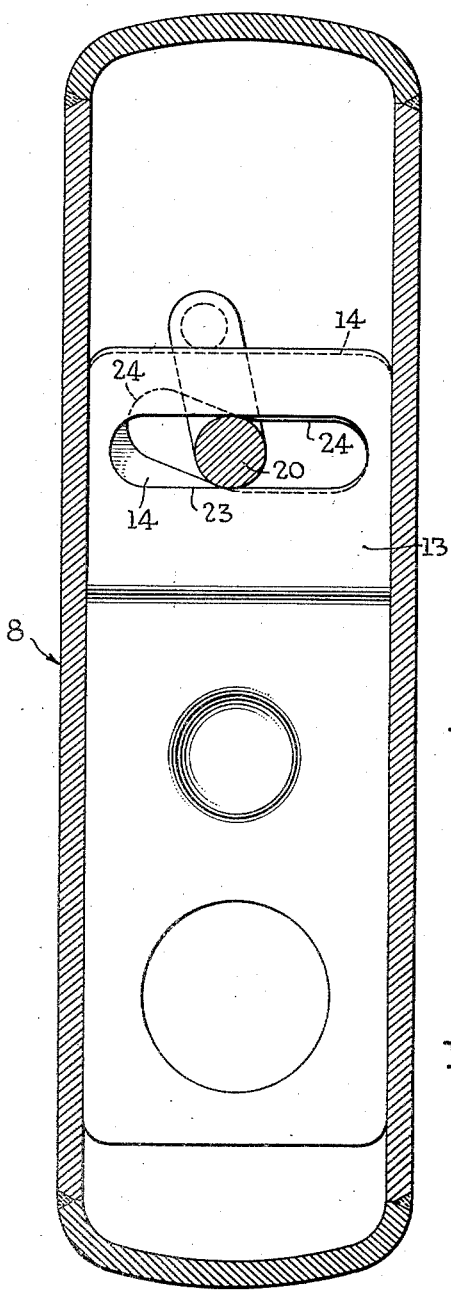
Figure 3 is a sectional view taken on line 3—3 of Figure 1, showing the gate assembly in closed and wedged position.
Figure 4:
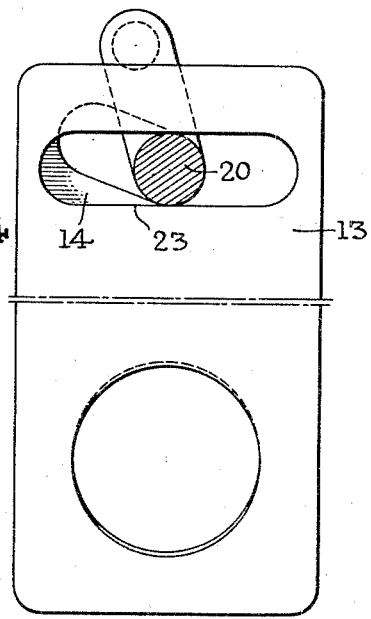
Figure 5:
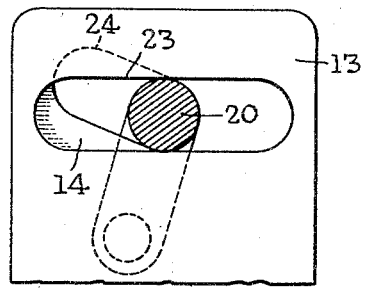
Figure 6:
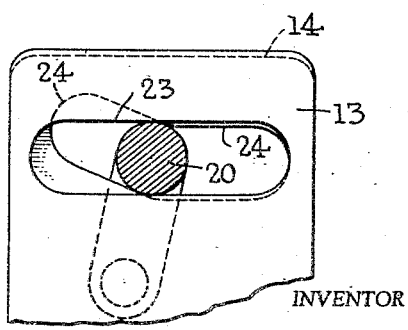
Figure 7:
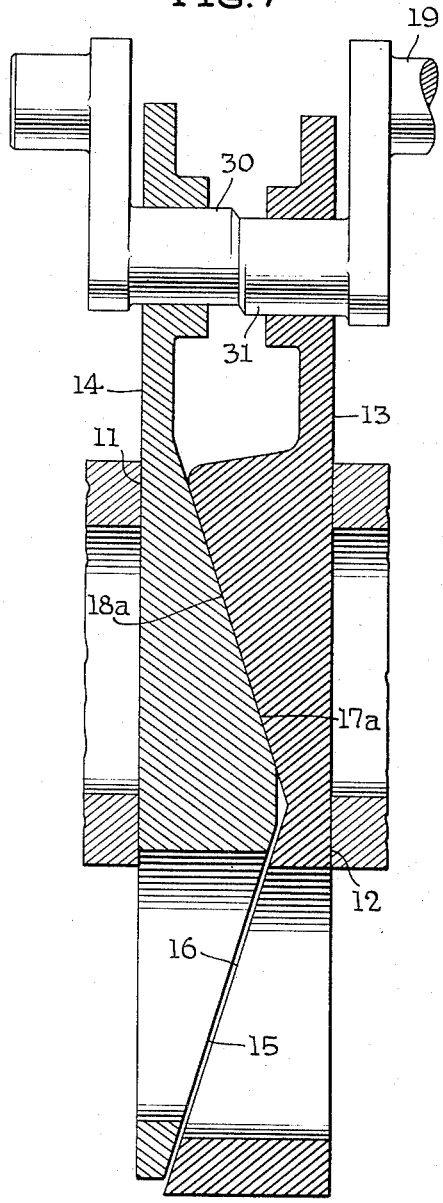
Figure 8:
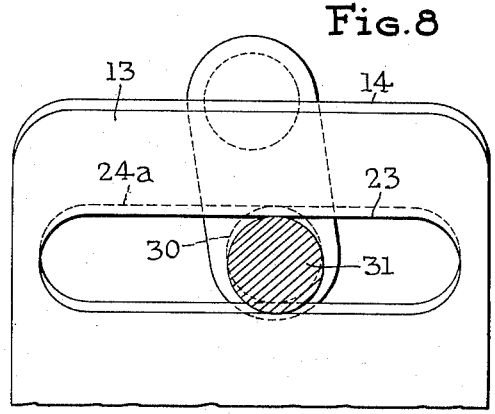
Figure 9:
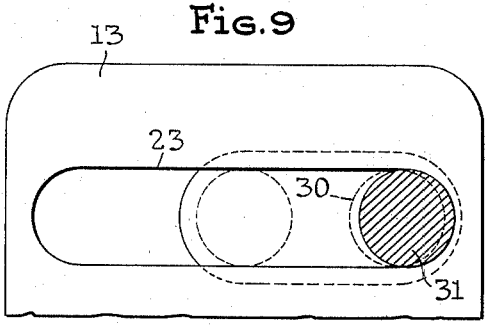
Figure 10:
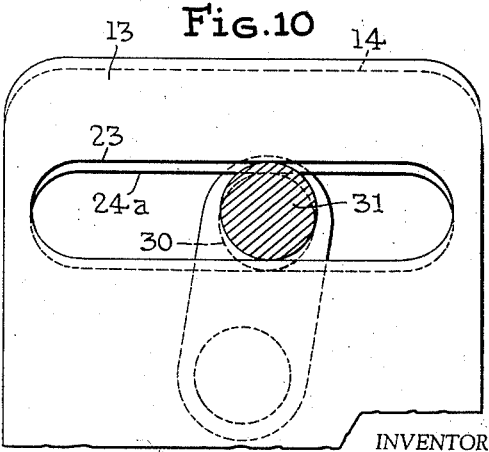

Figures 4, 5, and 6 are fragmentary views similar to Figure 3 and showing the operator and gate assemblies in their valve closed, but unwedged, valve open, but unwedged, and valve open and wedged position, respectively;

Figure 7 is a view similar to Figure 1, but showing a modification; and,

Figures 8, 9, and 10 are fragmentary views of the operator and gate assembly shown in Figure 7, in the closed sealed, midway, and open sealed position of the valve, respectively.

Referring now to Figure 1, the valve includes a body 8 having through conduit portions 9 and 10, the latter terminating inwardly of the body in valve seats 11 and 12. The gate assembly, which is mounted for rectilinear movement within the valve body to open and close the valve, includes a pair of ported members, one of which will be designated the segment member 13 and the other as the gate member 14. Each of the latter members are ported, as shown, to provide a smooth walled through conduit when the valve is in the open position. In addition, the gate and segment have mating faces 15 and 16, and 17 and 18, which surfaces are parallel to each other, but inclined at an angle to the plane of the gate assembly.

Figure 2 shows the segment 13 in detail. Relative movement, therefore, between the gate 14 and segment 13 results in a wedging action between the two to effect a positive lateral displacement in a direction normal to the valve seats. As shown in Figure 1, the valve is in its closed position and the gate and segment are wedged into sealing engagement with the valve seats. In order to unseat the gate and segment to allow the entire gate assembly to move freely to a valve open position, it will be obvious that the gate 14 must first be moved upwardly in order to contact the gate assembly so that it may move freely from the closed to the open position. One means for achieving this type of operation is disclosed in the above-mentioned Laurent patent. The apparatus for achieving the same result in the quick opening valve of this invention is as follows.

Rotatively mounted within the valve body 8 is a shaft 19. The offset crank or cam portion of this shaft, indicated at 20, is entirely within the valve body. The straight shaft portion 21 extends through the valve body and has, on its outer end, an operating handle 22. The shaft 21 must, of course, be packed in some way to effect a pressure tight seal. A conventional stem packing for achieving this purpose is shown in Figure 1.

Referring now to Figure 3, the segment 13 appears in full line, and portions of the gate 14 appear in dotted lines. The segment 13 has a transverse slot 23 adjacent the upper edge thereof and this slot is parallel to the upper and lower edges of the segment. The gate 14 is also slotted, but the slot 24, instead of corresponding to the segment slot, has half of its long dimension tilted upwardly at a slight angle to the axis of the segment slot. The offset crank portion 20 of the shaft 19 extends through the gate and segment slots as will be readily apparent from an inspection of Figures 1 and 3. Rotation of the shaft 19 will, therefore, cause rectilinear movement of the gate and segment and with a rotation of slightly less than 180° will move the gate and segment from open to closed position, or vice versa. If we assume the gate and segment to be in an intermediate position and moving toward closed position, this will correspond to a clockwise rotation of the shaft 19, as viewed in Figure 3 of the drawings. Both gate and segment will move in unison as long as the crank 20 is positioned in the righthand portion of the slots as viewed in Figure 3. With the crank in this portion, the gate assembly is positively unwedged and therefore assumes its smallest lateral dimension for free movement intermediate the open and closed positions of the valve. However, when the offset crank or cam portion 20 of the shaft 19 passes through the center line of Figure 2 and enters the lefthand portion of the slots 23 and 24, further clockwise movement will cause the offset portion to bear on the inclined portion of the gate slot and will, therefore, cause the gate to move further than the segment. It will be further apparent that movement of the crank portion 20 at this point becomes substantially parallel to the segment slot 23 and, therefore, little, if any, movement of the segment results. From an inspection of Figure 1, rotation of the crank 20 in this portion of the slots 23 and 24 effects positive lateral expansion of the gate assembly and will wedge the gate and segment into sealing relationship with their respective seats. To move the valve from closed to open position will then require counter-clockwise rotation of the shaft 19, as viewed in Figure 3. Initial rotation of the shaft from the position shown in Figure 3 will first cause upward movement of the gate since the initial movement of the offset portion will be substantially parallel to the segment slot. The same motion effects a camming action on the inclined portion of the gate slot and thus the desired initial relative movement between the two is effected.

Much the same set of circumstances arises at the top of the rotation of the crank corresponding to the open position of the valve. As the offset portion 20 passes the imaginary center line of Figure 3, further movement is substantially parallel to the segment slot, but exerts a camming action on the inclined portion of the gate slot, and therefore again effects a positive wedging lateral displacement between the gate and segment and forces these two members into sealing relationship with their respective seats. The various intermediate positions of the gate assembly and operator appear most clearly in Figures 3–6 inclusive.

Referring now to Figures 7, 8, 9, and 10 for a disclosure of a modification of the embodiment shown in Figures 1–6, inclusive, there is shown a somewhat different means for effecting the lateral expansion of the gate assembly. Corresponding parts are identified by the same reference numerals.

The offset crank portion of the shaft 19 is here provided with a pair of cam surfaces 30 and 31 having the same physical dimensions, but which are positioned at different radial distances from the axis of the shaft 19.

The segment 13 and gate 14 are provided with slots 23 and 24a. In this case the slots are identical in size and shape rather than one having a portion inclined to the other as in Figures 1–6.

In addition, segment 13 and gate 14 are again each provided with a pair of mating surfaces 15, 16, 17a, 18a, to effect wedging lateral displacement upon relative movement between the gate and segment. In the prior embodiment shown and described hereinbefore, these surfaces were all parallel to each other and the same arrangement would function equally well in this embodiment. Since a large number of valves are manufactured with the gate assemblies, as shown in Figure 7, this will merely serve to illustrate another working embodiment.

Figure 7 shows the valve in closed, sealed position as does Figure 8. Figure 9 shows the relative positions of the gate assembly and operator for a position intermediate the open and closed positions. The gate assembly, as shown in this figure, is collapsed to its smallest lateral dimension by reason of the fact that the slots 23 and 24a are aligned. Alignment of the slots has been effected by reason of the fact that the offset portions 30 and 31 have been rotated to a position in which they extend substantially horizontally from the axis of the shaft 19. Since 30 and 31 have the same physical dimensions, they will occupy the position indicated in Figure 9 corresponding to the aligned position of slots 23 and 24a. In Figure 10 the gate, segment and valve operator are shown in their respective relative positions corresponding to the open sealed position of the valve. The effect of the different radial distance of the members 30 and 31 from the axis of the shaft 19 acts as in Figure 8, which shows the closed sealed position of the valve to achieve an open sealed position of the valve. With the type of gate assembly shown in Figure 7 surfaces 17a and 18a provide the wedging action for the closed position of the valve, while surfaces 15 and 16 provide the wedging for the open position of the valve. In Figures 7 and 8, therefore, surfaces 17a and 18a would be in direct contact, while there would be a slight separation between surfaces 15 and 16, as appears in Figure 7. In Figure 10, however, surfaces 15 and 16 will be in direct contact and there will be a limited interval of separation between surfaces 17a and 18a.

From the foregoing it will be apparent that there is shown and disclosed herein a new and useful valve and there will be equivalents within the scope of the appended claims.

I claim:

1. A through conduit gate valve comprising: a housing forming a valve chamber having aligned ports provided with opposed parallel valve seats; an expansible valve gate assembly mounted for rectilinear movement between said seats to open and close the valve, said assembly including two ported abutting members having parallel outer sealing faces to engage the valve seats and complementary opposed inner faces each formed with at least one surface portion which is inclined with respect to said seats to form at least one set of wedging surfaces effective upon relative displacement therebetween in a direction parallel to the movement of said assembly, to expand said assembly normally of said seats and force said members oppositely into sealing engagement therewith; elongated horizontally positioned openings formed in each of the ported abutting members, portions of the walls defining said openings being transversely aligned when the sealing faces are out of engagement with the valve seats, and the walls of the opening in one of said members having at least a portion vertically displaced from the corresponding wall of the other opening when the sealing faces are in engagement with said valve seats, and a horizontal shaft rotatably mounted in the valve body and extending through one wall thereof, said shaft including an offset crank portion, said offset crank portion extending through said slots and being swingable about the axis of said shaft for engaging said displaced wall when in one position to retract the sealing faces from the valve seats and upon further movement to simultaneously engage the walls of both slots to move said gate valve assembly in the direction of its length.

2. A through conduit gate valve comprising: a housing forming a valve chamber having aligned ports provided with opposed parallel valve seats; an expansible valve gate assembly mounted for rectilinear movement between said seats to open and close the valve, said assembly including two ported abutting members having parallel outer sealing faces to engage the valve seats and complementary opposed inner faces each formed with at least one surface portion which is inclined with respect to said seats to form at least one set of wedging surfaces effective upon relative displacement therebetween in a direction parallel to the movement of said assembly, to expand said assembly normally of said seats and force said members oppositely into sealing engagement therewith; means defining an elongated opening in each of the ported abutting members, said openings extending transversely thereof and the opening in one of said members having at least a portion, the axis of which lies at an angle to the axis of the opening, in the other of said members; and a shaft rotatably mounted in the valve body, extending through one wall thereof, and having a crank portion received within the body, said crank portion extending through said elongated openings; whereby rotation of said shaft serves to open and close the valve, to positively wedge the gate assembly into sealing relation with the valve seats adjacent each end of its path of travel, and to positively unwedge said assembly during movement between the ends of travel.

3. A through conduit gate valve comprising: a housing forming a valve chamber having aligned ports provided with opposed parallel valve seats; an expansible valve gate assembly mounted for rectilinear movement between said seats to open and close the valve, said assembly including two ported abutting members having parallel outer sealing faces to engage the valve seats and complementary opposed inner faces each formed with at least one surface portion which is inclined with respect to said seats to form at least one set of wedging surfaces effective upon relative displacement therebetween in a direction parallel to the movement of said assembly, to expand said assembly normally of said seats and force said members oppositely into sealing engagement therewith; means defining an elongated opening in each of the ported abutting members, said openings extending transversely of said members and in parallel relation to each other; and a shaft rotatably mounted in the valve body, extending through one wall thereof and having a crank arm received within the body, said crank arm including a pair of cam surfaces, one of which lies at a greater radial distance from the axis of the shaft than the other, one of said surfaces engaging one of said members through the opening therein and the other of said surfaces engaging the other of said members through the opening therein; whereby rotation of said shaft serves to open and close the valve and to positively wedge the gate assembly into sealing relation with the valve seats adjacent each end of its path of travel.

4. A through conduit gate valve as defined by claim 2 in which the axis of the shaft is placed in a plane perpendicular to the plane of the gate assembly and is slightly offset transversely of the valve body.

5. A through conduit gate valve as defined by claim 2 in which the openings extend substantially equidistantly on either side of the center line of the ported members and in which the inclined portion of said one opening begins at the center line of said member.

References Cited in the file of this patent

UNITED STATES PATENTS

| | | |
|---|---|---|
| 146,796 | Wilson | Jan. 27, 1874 |
| 589,008 | Martin | Aug. 31, 1897 |
| 2,718,372 | Broz | Sept. 20, 1955 |